(12) United States Patent
Koller et al.

(10) Patent No.: US 11,306,643 B2
(45) Date of Patent: Apr. 19, 2022

(54) PLANT FOR ABSORPTION OF INDIVIDUAL COMPONENTS IN GASES

(71) Applicant: ANDRITZ AG, Graz (AT)

(72) Inventors: Martin Koller, Graz (AT); Thomas Gurker, Graz (AT); Bernhard Dunkl, Graz (AT)

(73) Assignee: Andritz AG, Graz (AT)

( * ) Notice: Subject to any disclaimer, the term of this patent is extended or adjusted under 35 U.S.C. 154(b) by 534 days.

(21) Appl. No.: 16/375,226

(22) Filed: Apr. 4, 2019

(65) Prior Publication Data

US 2019/0323409 A1 Oct. 24, 2019

(30) Foreign Application Priority Data

Apr. 19, 2018 (AT) .................................. 50330/2018

(51) Int. Cl.
| | |
|---|---|
| *F01N 3/08* | (2006.01) |
| *F01N 13/00* | (2010.01) |
| *F01N 13/08* | (2010.01) |
| *F23J 13/06* | (2006.01) |
| *F23J 15/04* | (2006.01) |
| *B01D 53/74* | (2006.01) |
| *B01D 53/14* | (2006.01) |
| *B01D 53/78* | (2006.01) |

(52) U.S. Cl.
CPC ........... *F01N 13/085* (2013.01); *B01D 53/74* (2013.01); *F01N 3/0807* (2013.01); *F01N 13/004* (2013.01); *F23J 13/06* (2013.01); *F23J 15/04* (2013.01); *B01D 53/14* (2013.01); *B01D 53/78* (2013.01); *B01D 2252/1035* (2013.01); *B01D 2258/01* (2013.01); *F01N 2610/1453* (2013.01); *F23J 2219/40* (2013.01)

(58) Field of Classification Search
CPC ........ B01D 53/34; B01D 53/74; B01D 53/78; B01J 10/00; B01J 19/00; B01J 19/24; B01J 19/26; B01J 2219/00; B01J 2219/00002; F01N 3/08; F01N 13/00; F01N 13/08; F01N 13/085; F23J 13/06; F23J 15/04; F23J 2213/50
See application file for complete search history.

(56) References Cited

U.S. PATENT DOCUMENTS

| | | | |
|---|---|---|---|
| 3,633,882 A | 1/1972 | Karakawa et al. | |
| 7,114,330 B1 * | 10/2006 | Schellin | ................ F01N 13/085 60/309 |

(Continued)

FOREIGN PATENT DOCUMENTS

| | | |
|---|---|---|
| AT | 14588 U1 | 2/2016 |
| CA | 2196217 C | 11/2000 |

(Continued)

*Primary Examiner* — Timothy C Vanoy
(74) *Attorney, Agent, or Firm* — Alix, Yale & Ristas, LLP

(57) ABSTRACT

A plant for the absorption of individual components, such as pollutants or recyclable materials, in gases, in which an absorption solution is brought into contact with the gas in an absorption chamber, where the absorption solution is fed into the absorption chamber through spray nozzles and the gas can be fed into the absorption chamber from below through a vertical inlet duct, where the inlet duct is covered by a roof structure. The roof structure is made up of a large number of lamellae placed one on top of one another and with spaces in between.

20 Claims, 7 Drawing Sheets

(56) References Cited

U.S. PATENT DOCUMENTS

| | | | |
|---|---|---|---|
| 10,563,553 B2 | 2/2020 | Bahadur Thapa et al. | |
| 2014/0338310 A1 | 11/2014 | Peng | |
| 2016/0016109 A1* | 1/2016 | Strandberg | B01D 3/26 423/243.08 |

FOREIGN PATENT DOCUMENTS

| | | | | |
|---|---|---|---|---|
| CN | 106512641 A | 3/2017 | | |
| DE | 2403472 A1 | 9/1974 | | |
| DE | 32 22 387 A * | 6/1982 | ............. | F23L 17/14 |
| DE | 9304777 U1 | 6/1994 | | |
| EP | 2687281 B1 | 9/2015 | | |
| FR | 3 051 436 A1 * | 11/2017 | ........... | F01N 13/004 |
| GB | 120304 | 11/1918 | | |
| KR | 20010112081 A | 12/2001 | | |
| WO | 2012105905 A1 | 8/2012 | | |

* cited by examiner

Section A-A

Section B-B

PLANT FOR ABSORPTION OF INDIVIDUAL COMPONENTS IN GASES

BACKGROUND

The disclosed embodiments concern a plant for the absorption of individual components (e.g. pollutants or recyclable materials) in gases, where an absorption solution is brought into contact with the gas in an absorption chamber. In this plant, the absorption solution is fed into the absorption chamber through spray nozzles. The gas is fed to the absorption chamber from below through a vertical inlet duct, where the inlet duct has an opening that is covered by a roof structure at a distance from the opening. The horizontal projection of the roof structure is larger than the horizontal projection of the inlet opening, with the result that the absorption solution cannot drip into the inlet opening.

In many industrial processes, especially in combustion processes, exhaust gases and exhaust air, respectively, are formed that contain acid components such as sulphur dioxide ($SO_2$), hydrochloric acid (HCl), hydrofluoric acid (HF), and/or nitrogen oxides (NO, $NO_2$), which are referred to as pollutants because they are harmful to the ecosystem, or recyclable materials such as metal oxides are also formed that are transferred to a gaseous state as a result of the treatment process.

Various technologies are already known from the state of the art for so-called wet exhaust gas and flue gas treatment, where the absorption chamber is designed as a spray tower in the form of a droplet column. There are stationary plants that are mainly used for flue gas cleaning in power stations, but mobile plants are also known that clean the exhaust gases from a combustion motor.

The current state of the art for mobile exhaust gas cleaning plants, on shipping vessels for example, is derived technologically from stationary plants. Here, the exhaust gas is either fed into the scrubber (absorption chamber) through a side opening, or it enters the scrubber from below. Shielding against the dispersed washing fluid (absorption solution) is achieved by a single protective roof (like a Chinese hat) mounted on the inlet duct.

The side gas inlet in mobile plants is the direct, technical transposition of the stationary design and is considered a technically sound solution because the risk of the washing fluid passing through into the exhaust gas section can be largely prevented by raising the path of the duct and building an artificial slope towards the scrubber. However, unlike the stationary solution, larger safety reserves must be included when planning this configuration because slug flows (e.g. due to the angle of list of a vessel) must be taken into consideration. One disadvantage of a side inlet for flue gas is the resulting large space requirement for feeding the exhaust gas into the scrubber at the side. The feed duct is transferred from the vertical axis in a wide deflecting curve into a horizontal duct section and the underside of the duct is provided with a substantial gradient or a weir in this process in order to prevent liquid flowing in as mentioned above. As the exhaust gas is fed into the lower part of the scrubber, the installation area for the scrubber is approximately doubled, depending on the model.

The vertical gas feed into the scrubber with a simple roof structure (Chinese hat) may be a structurally pleasing alternative to a side inlet, however there is no full protection in general against the washing fluid passing through into the exhaust gas section so it can only be used without risk in special cases. In practice, the pressure loss is greatly increased by use of the simple roof structure because the gas flow is deflected twice due to the roof structure and must flow over the roof sides in a narrow radius. This constriction has the effect that only a small part of the free cross-section available is used. The flow through the remaining cross-section of the duct is either inadequate in places or a recirculation zone forms. The latter has an effect on the local pressure conditions such that the gas flows in the opposite direction through parts of the free cross-section. As a result, there is a risk of droplets being carried along in the exhaust gas line. The resulting increase in pressure loss means that the requirements of the overall plant cannot be fulfilled or that economic operation of the plant deteriorates significantly.

SUMMARY

Provided herein is a cleaning plant for flue gas or exhaust gas requiring an installation area that is as small as possible, where the pressure loss occurring is kept to a minimum and the risk of droplets of the absorption solution passing through into the flue gas or exhaust gas line is largely excluded.

As a result of the vertical gas inlet, the necessary installation area for the cleaning plant can be minimized and the pressure loss occurring is kept to a minimum due to the roof structure according to the invention, which is formed by a large number of lamellae placed one on top of the other with spaces in between. By choosing a vertical scrubber inlet instead of side inlet, the space requirement can be reduced by approximately half. This is an advantage in the planning, especially in mobile plants such as the application on shipping vessels. Even greater advantages result when retrofitting existing exhaust gas systems because the compact system can be integrated easily into the existing structure.

The plant disclosed herein is especially suited for cleaning exhaust gases from shipping vessels. In this process, the pollutants from the exhaust gases are removed with the aid of sea water, adding sodium hydroxide or sodium carbonate if needed.

The lamellae run preferably towards the wall of the absorption chamber at a downward slant, ideally at an angle of inclination angle of 50° to 70°, preferably at 60°. This range provides the optimum compromise between adequate protection against liquid entering the inlet duct and the lowest possible gas deflection to reduce the pressure loss.

It is useful if the ducts between the lamellae are longer than the spacing between the lamellae forming the ducts. This too prevents liquid from entering the inlet duct.

The roof structure can be pyramidal or conical in shape, for example.

In a Preferred Embodiment, the Gas Distribution Level is Disposed Above the Roof Structure.

With this gas distribution level, the gas fed in is homogenized on the one hand, and a highly turbulent suspension regime (liquid layer) is created on the other hand. The gas distribution level, for example, can consist of a large number of pipes connected to one another.

It is favourable if the lamellae are curved towards the gas inlet in an arched shape in the initial section as this will support gas deflection and reduce the pressure loss further. It is also favourable here if the lamellae run vertically upwards first of all, are then deflected in an arched shape, and finally run downwards at a slant. This promotes very good gas deflection.

BRIEF DESCRIPTION OF THE DRAWINGS

In the following, the invention is described on the basis of drawings. In these drawings.

DETAILED DESCRIPTION

Figure 1:
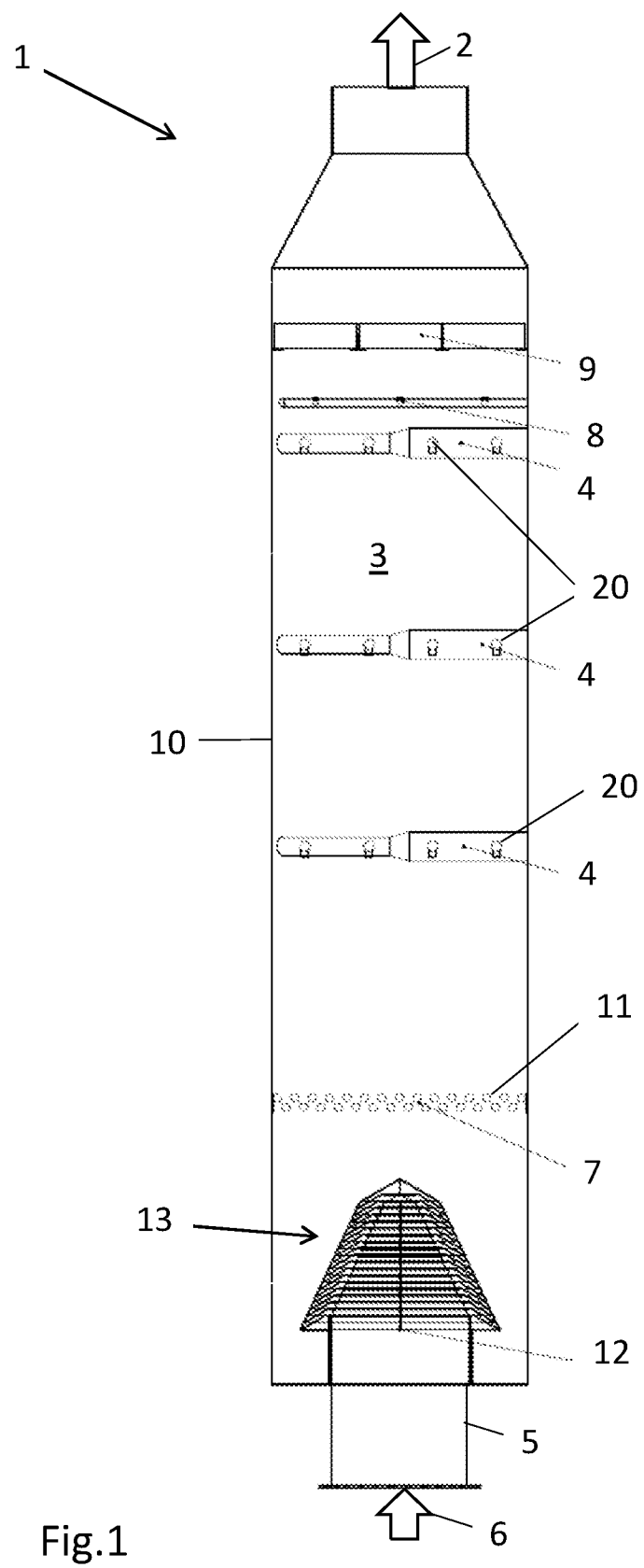
FIG. 1 shows an example of an embodiment of the disclosed plant.

The same reference numerals in the individual figures refer to the same plant components in each case.

FIG. 1 shows a cross-section through an exhaust gas cleaning plant 1. Here, exhaust gas flows in vertical direction 6 through the inlet duct 5 from below into the absorption chamber 3, which is preferably cuboid in shape and is delimited by the wall of the chamber 10. Compared to plants with a side inlet, this results in a smaller installation area ("footprint") for the exhaust gas cleaning plant, which depends greatly on the design of the entrance to the scrubber.

The exhaust gas flows through the absorption chamber 3 from the bottom upwards and exits through the gas outlet 2.

The opening 12 in the inlet duct 5 is covered by a pyramidal roof structure 13. In this embodiment both the roof 13 and the inlet duct have a rectangular, preferably substantially square base area (peripheral shape). The gas distribution area 7, which consists of a large number of individual tubes 11, is located directly above the roof structure 13. Due to the gas distribution level 7, the exhaust gas is distributed more evenly inside the absorption chamber 3 and turbulence is generated in the flue gas as a result, leading to more intensive mixing of the gas with the absorption solution.

The absorption solution is fed through spray nozzles 20 on the spraying levels 4 into the absorption chamber 3 and comes into contact with the exhaust gas in droplet form. The roof structure prevents the absorption solution from entering the inlet duct 5 and thus gaining access to the exhaust gas section.

A flushing device 8 and a demister 9 are provided above the spraying levels 4.

Figure 2:
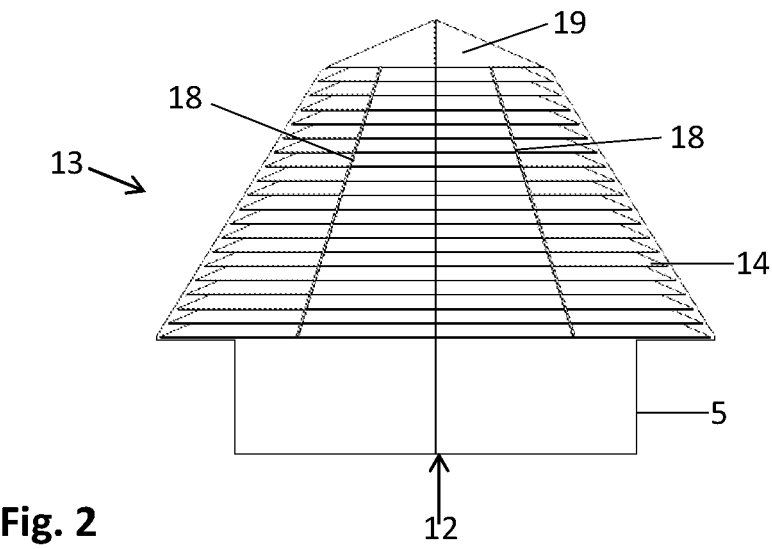
FIG. 2 shows a side view of a roof structure of the plant according to the disclosure.

FIG. 2 shows the roof structure 13 in a side view. The roof structure 13 comprises a plurality of lamellae 14 disposed one above the other and with spacing in between so that the exhaust gas can enter the absorption chamber 3 through the ducts 15 formed between the respective lamellae 14. The gas flow, which is vertical first of all, is deflected towards the lamellae 14 in the distribution chamber inside the roof structure 13 such that the free cross-sections are subject to even load. The sides of the roof structure 13 are tapered here in an upward direction and converge at a point or auxiliary roof 19, respectively, at the top with a small area.

The primary objective of this arrangement is to maximize and optimize, respectively, the free cross-section for the exhaust or flue gas flowing into the absorption chamber 3.

The secondary objective of this arrangement compared to vertically disposed roof sides is that the upwardly tapering roof structure 13 provides additional space to flow through. Due to enlargement of the free area for flowing through, the exhaust or flue gas is decelerated directly after exiting from the lamellae 14 and deflected upwards quickly. Unlike deflection in a Chinese hat-shaped roof, where the flow is upward with uneven distribution in the form of strands, the exhaust or flue gas here flows upwards unrestrained in a plug flow.

Figure 3:
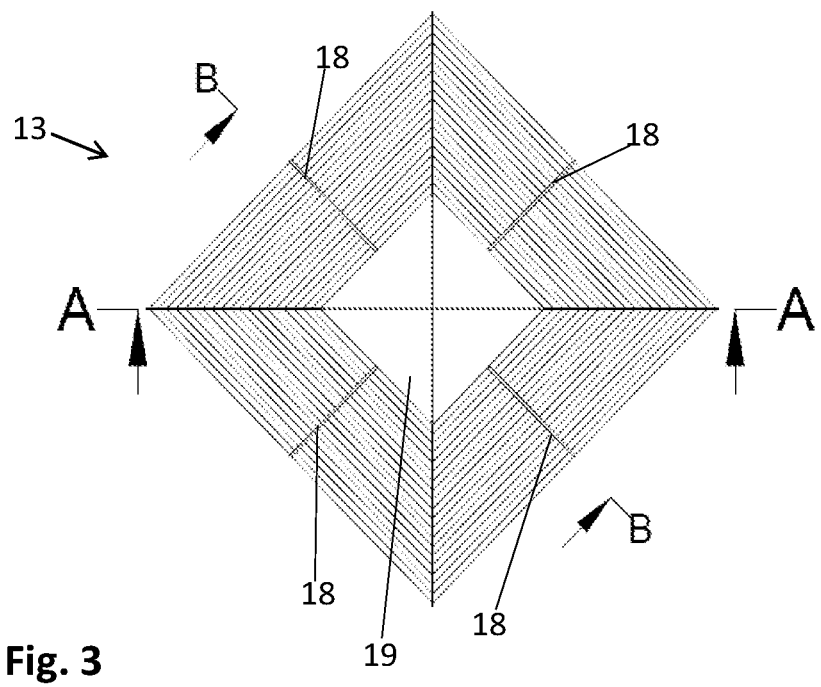
FIG. 3 shows a top view of the roof structure in FIG. 2.

FIG. 3 shows a top view of an embodiment of the roof structure 13. The struts 18 connecting the individual lamellae 13 at their outer ends, thus preventing the lamellae 14 from flapping, are visible here.

Figure 4:
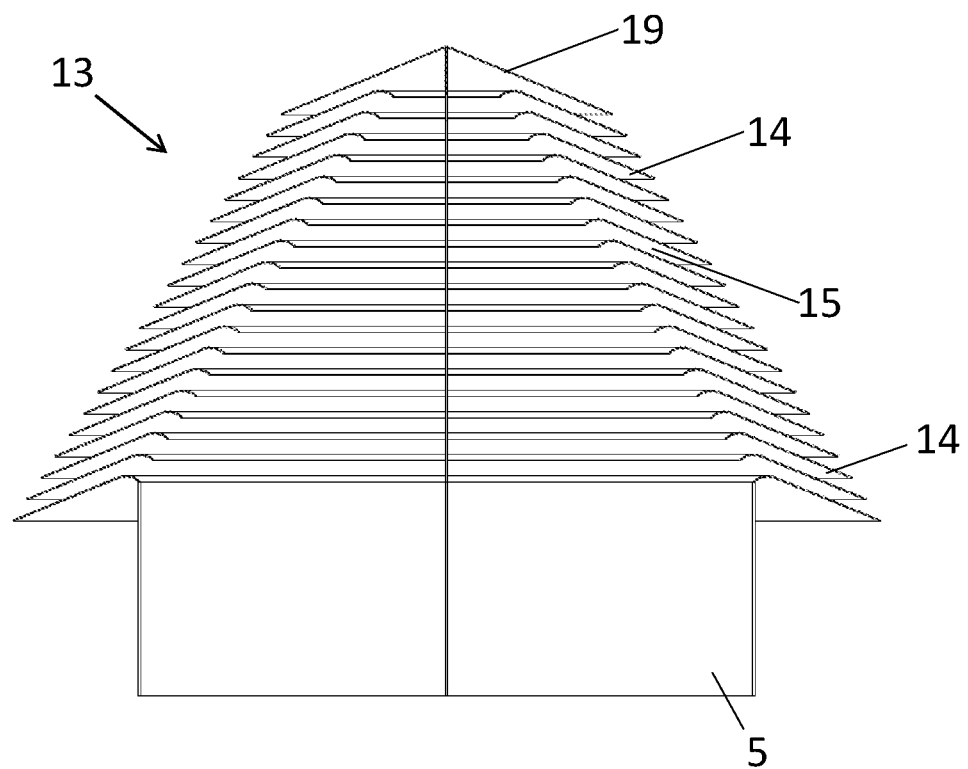
FIG. 4 shows a sectional view along the line marked A-A in FIG. 3.
Figure 5:
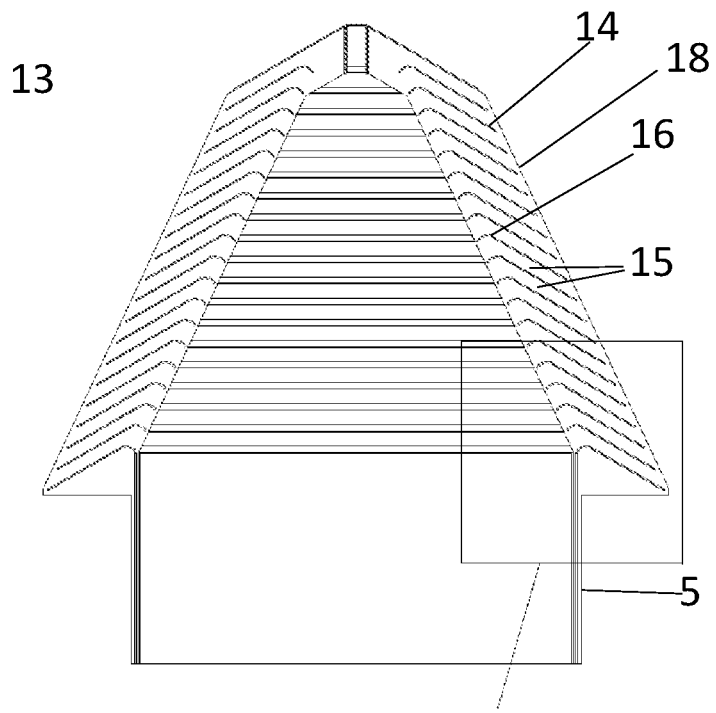
FIG. 5 shows a further sectional view along the line marked B-B in FIG. 3.

FIGS. 4 and 5 each show sectional views along the lines marked A-A and B-B (see FIG. 3), respectively.

Figure 6:
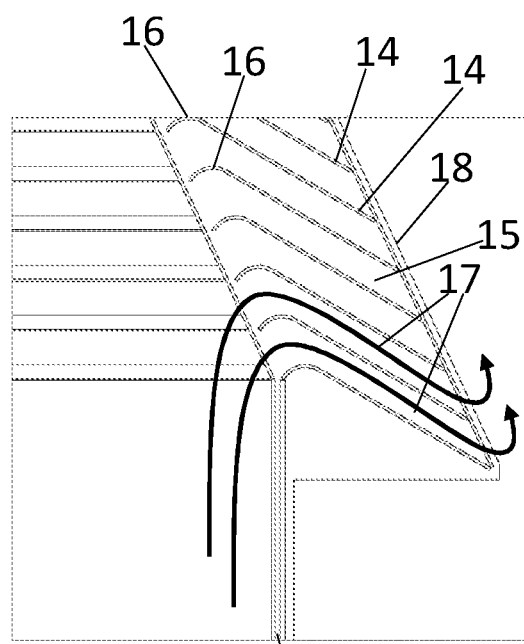
FIG. 6 shows a detailed view of the roof structure according to FIG. 5.

FIG. 6 shows a detailed view of the roof structure 13 according to FIG. 5. The lamellae 14 here have an initial section 16 that is curved in an arched shape towards the gas inlet. As a result, the gas can flow evenly in along the deflection between the individual lamellae 14 and any local break in flow or recirculation after deflection is prevented. The gas flow is indicated by the two arrows 17. This optimized flow path minimizes the pressure loss significantly compared to the solution with a Chinese hat-shaped roof structure.

Figure 7:
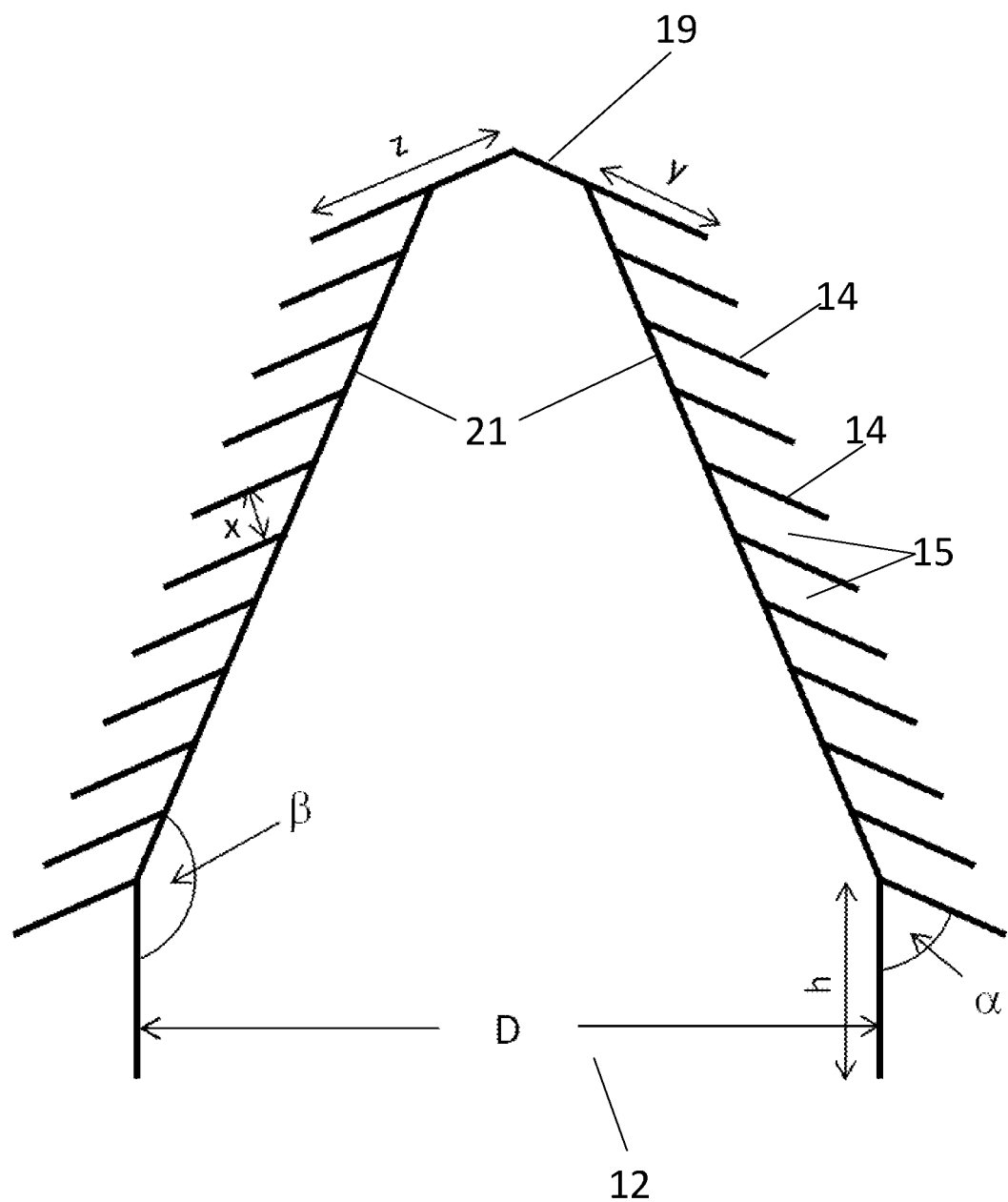
FIG. 7 shows a schematic view of the roof structure.

FIG. 7 shows a schematic view of the roof structure 13 to illustrate individual dimensions and angles.

Investigations have demonstrated that it is favourable if the ratio between the cross-sectional area of the inlet duct 5 and the cross-sectional area of the absorption chamber 3 (measured at the height of the opening 12) is between 0.3 and 0.5.

For example, the length of the sides of the square inlet duct 5 are 1500 mm here. The distance h between the bottommost lamella 14 and the floor of the scrubber is 500 mm here.

The length y of the lamellae 14 and the spacing x between the lamellae have been chosen such that droplets cannot enter in the opposite direction to the flow exiting.

The length y of the lamellae 14 should preferably be between 150 and 300 mm, where the lamella spacing x should be between 40 and 60 mm, preferably 50 mm. Thus, the preferred ratio of length of lamellae to spacing between lamellae (y:x) is within a range of approximately 2:1 to 8:1, more preferably within a range of approximately 2.5:1 to 7.5:1, and more preferably between 3:1 to 6:1. The lamella 14 of the auxiliary roof 19 have a length z of 290 mm here.

The setting angle α of the individual lamella 14 in relation to the vertical should be between 50° and 70°, preferably 60°. This angle α was selected with regard to the pressure loss so that the necessary deflection against the actual main direction of flow is reduced to a minimum.

The angle β of the roof pitch 21 should be in a range of 140° to 170° in relation to the vertical, especially 155°.

Figure 8:
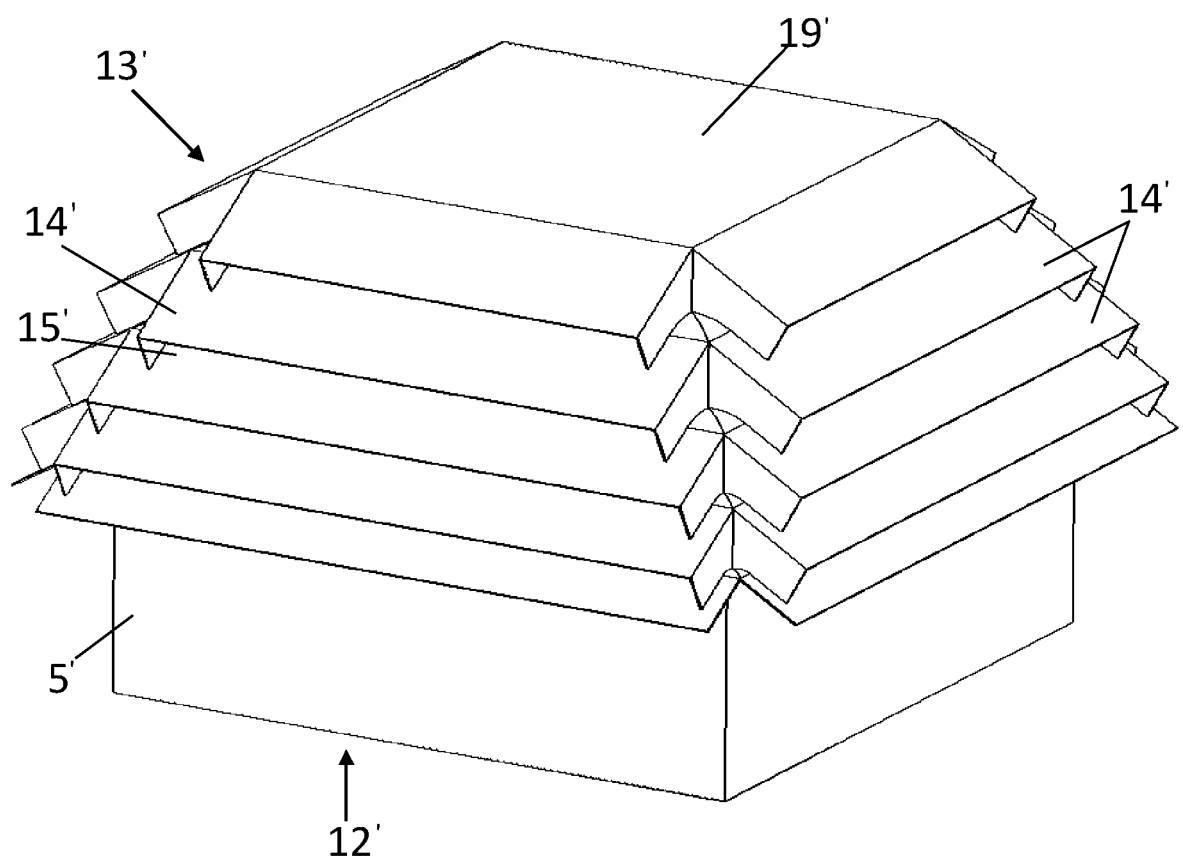
FIG. 8 shows another embodiment of the roof structure according to the invention.

FIG. 8 shows another embodiment of the disclosed roof structure 13'. This roof structure 13' has a square horizontal projection and five lamellae 14' per side. Here, the upper side here is closed off by a flat auxiliary roof 19'.

Figure 9:
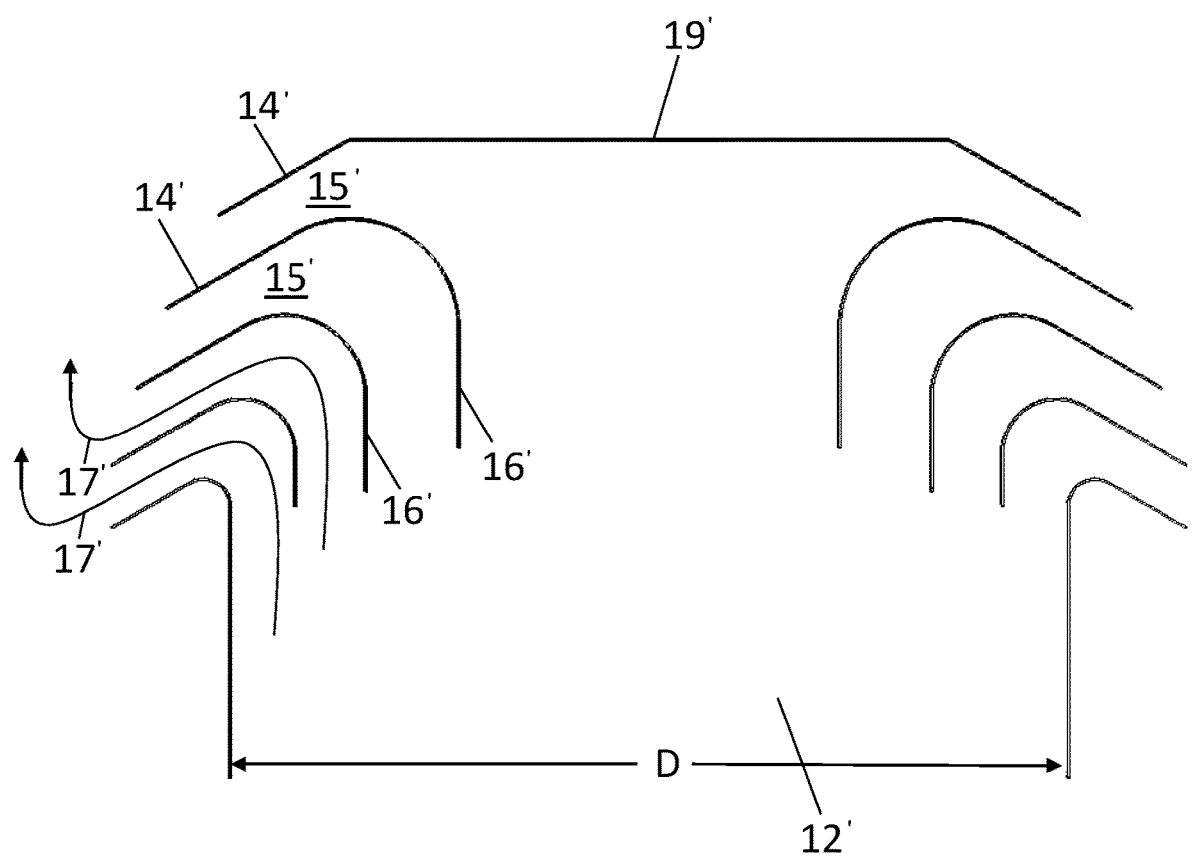
FIG. 9 shows a sectional view through FIG. 8.

FIG. 9 shows a cross-section through the auxiliary roof 13' according to FIG. 8. The shape of the lamellae 14' is clearly visible here. Viewed in the flow direction of the flue gas (upward in the view of FIGS. 8 and 9), the lamella 14 have a vertical and straight initial section 16'. Adjacent to this is a curved section that finally becomes a straight section running downwards at a slant. As a result of the lamella shape in this embodiment, the flue gas is deflected very gently into the ducts 15'. The flow of gas through the ducts 15' is indicated by the two arrows 17'. The topmost lamellae 14" do not have a vertical or curved section because they are connected directly to the flat auxiliary roof 19'.

It is useful for stable operation if the gas speed is approximately 14-18 m/s in the inlet duct (5, 5') because significantly higher or lower flow speeds would result in inadequate flow distribution inside the roof structure (13, 13'). The speed of the gas in the ducts (15, 15') should range between 7 and 27 m/s.

LIST OF REFERENCE NUMERALS

1 Exhaust gas cleaning plant
2 Gas exit
3 Absorption chamber
4 Spraying level
5 Inlet duct
6 Vertical direction
7 Gas distribution level
8 Flushing pipe
9 Demister
10 Vessel wall
11 Pipes in the gas distribution level
12 Inlet duct opening
13 Roof structure
14 Lamellae
15 Ducts
16 Initial section of the lamellae
17 Gas flow
18 Struts
19 Auxiliary roof
20 Spray nozzles
21 Roof side
α, β Angles
x Spacing between lamellae
y Length of lamellae
z Length of lamellae for auxiliary roof
D Diameter of inlet duct
h Height of inlet duct in absorption chamber

What is claimed is:

1. A plant (1) for the absorption of individual components in gases, comprising
an absorption chamber (3) having a spraying level (4) with spray nozzles (20) for feeding an absorption solution into the absorption chamber (3);
a vertical inlet duct (5) at a lower end of the absorption chamber (3) beneath the spraying level (4), the vertical inlet duct (5) having an opening (12) with a first width in a first direction covered by a roof structure (13) with a second width in the first direction, wherein
the second width of the roof structure (13) is larger than the first width of the inlet opening (12), thereby preventing the absorption solution from dripping into the inlet opening (12),
the roof structure (13) is formed by a plurality of lamellae (14) positioned one on top of another with space therebetween, and
the lamellae (14) include an initial section (16) that is curved in an arched shape to enhance deflection of gas entering the inlet duct (5).

2. The plant according to claim 1, wherein the absorption chamber (3) includes an outer wall (10) and the lamellae (14) run on a downward slant toward the outer wall (10) such that the gas flowing upward through the inlet duct (5) is deflected downwards on a slant and fed to the absorption chamber (3) through ducts (15) defined by the space between the lamellae (14).

3. The plant according to claim 2, wherein the lamellae (14) extend at an angle α relative to a vertical within a range of 50° and 70°.

4. The plant according to claim 3, wherein the angle α is approximately 60°.

5. The plant according to claim 2, wherein a length y of the ducts (15) formed between the lamellae (14) is greater than a spacing x between the lamellae (14) that form the ducts (15).

6. The plant according to claim 5, wherein a ratio of length of the ducts to spacing between respective lamellae (y:x) is within an approximate range of 2:1 to 8:1.

7. The plant according to claim 6, wherein the ratio of y:x is within an approximate range of 3:1 to 6:1.

8. The plant according to claim 1, wherein the roof is angled upwardly and includes sides inclined at a pitch angle β within a range of 140° and 170° relative to a vertical.

9. The plant according to claim 8, wherein the pitch angle β is approximately 155°.

10. The plant according to claim 1, wherein the lamellae (14) form a pyramidal roof structure (13).

11. The plant according to claim 1, wherein the lamellae (14) form a conical roof structure (13).

12. The plant according to claim 1, wherein a gas distribution level (7) is disposed in the absorption chamber (3) above the roof structure (13) and generates turbulence in gas flow fed into the absorption chamber (3) from the inlet duct (5).

13. A plant (1) for the absorption of individual components in gases, comprising
a longitudinally extending absorption chamber (3) having a spraying level (4) with spray nozzles (20) for feeding an absorption solution into the absorption chamber (3);
an inlet duct (5) at a position upstream of the spraying level (4), the inlet duct (5) having an opening (12) with a first periphery covered by a roof structure (13) with a second periphery that extends beyond the first periphery of the opening (12), thereby preventing the absorption solution from dripping into the inlet opening (12), and
the roof structure (13) is formed by a plurality of spaced apart lamellae (14), a flow duct (15) being defined by the spacing between each adjacent spaced apart lamellae (14) for flow of gas from the inlet duct (5) into the absorption chamber (3), wherein
the lamellae (14) include an initial section (16) that is curved in an arched shape to enhance deflection of gas entering the inlet duct (5).

14. The plant according to claim 13, wherein the one or both of the first periphery and the second periphery has a rectangular shape.

15. The plant according to claim 13, wherein the flow ducts (15) have a length y and lamellae (14) are spaced apart a distance x that is less than the length y.

16. The plant according to claim 15, wherein a ratio of length of the ducts to spacing between respective lamellae (y:x) is within an approximate range of 2:1 to 8:1.

17. The plant according to claim 16, wherein the ratio of y:x is within an approximate range of 3:1 to 6:1.

18. A plant (1) for the absorption of individual components, such as pollutants or recyclable materials in gases, comprising
a longitudinally extending absorption chamber (3) having a spraying level (4) with spray nozzles (20) for feeding an absorption solution into the absorption chamber (3);
an inlet duct (5) at a position upstream of the spraying level (4), the inlet duct (5) having an opening (12) with a first periphery covered by a roof structure (13) with a second periphery that extends beyond the first periphery of the opening (12), thereby preventing the absorption solution from dripping into the inlet opening (12), and the roof structure (13) is formed by a plurality of spaced apart lamellae (14), a flow duct (15) being defined by the spacing between each adjacent spaced apart lamellae (14) for flow of gas from the inlet duct (5) into the absorption chamber (3), wherein the lamellae (14) include an initial section (16) that runs upward vertically and then curves in an arched shape to enhance deflection of the gas.

19. The plant according to claim 18, wherein a gas distribution level (7) is disposed in the absorption chamber (3) above the roof structure (13) and generates turbulence in gas flow fed into the absorption chamber (3) from the inlet duct (5).

20. The plant according to claim 19, wherein a ratio of length of the ducts to spacing between respective lamellae (y:x) is within an approximate range of 3:1 to 6:1.

* * * * *